United States Patent [19]

Chiu

[11] Patent Number: 4,663,448

[45] Date of Patent: May 5, 1987

[54] ALDEHYDE-CONTAINING HETERPOLYSACCHARIDES, A PROCESS FOR THEIR PREPARATION, AND THE USE THEREOF

[75] Inventor: Chung-Wai Chiu, Westfield, N.J.

[73] Assignee: National Starch and Chemical Corporation, Bridgewater, N.J.

[21] Appl. No.: 790,574

[22] Filed: Oct. 23, 1985

[51] Int. Cl.$^4$ .............................................. C08B 31/08
[52] U.S. Cl. .................................... 536/111; 536/104; 525/54.24; 106/210
[58] Field of Search ............................. 536/104, 111; 525/54.24; 106/210

[56] References Cited

U.S. PATENT DOCUMENTS 3,297,604  1/1967  Germino .............................. 525/54.2

OTHER PUBLICATIONS

Patent Application Ser. No. 577,463 for J. Tsai et al. filed on Feb. 6, 1984.
Patent Application Ser. No. 790,577 for C-W. Chiu filed Oct. 23, 1985.

Primary Examiner—Ronald W. Griffin
Attorney, Agent, or Firm—Lori D. Tolly; Margaret B. Kelley

[57] ABSTRACT

Novel aldehyde-containing synthetic heteropolysaccharides are provided by enzymatically oxidizing hydroxypropyl galactoglycoside starch ethers or novel ethyl galactoglycoside starch ethers with galactose oxidase.

19 Claims, No Drawings

ALDEHYDE-CONTAINING HETERPOLYSACCHARIDES, A PROCESS FOR THEIR PREPARATION, AND THE USE THEREOF

BACKGROUND OF THE INVENTION

This invention relates to novel aldehyde-containing synthetic heteropolysaccharides and a process for their preparation.

Polysaccharide compositions have been utilized in many diverse industrial applications, for example, as thickeners, adhesives, sizing agents, etc. Polysaccharides such as starch and cellulose, which have been modified to contain aldehyde groups, have found use particularly in the paper and textile industries.

Both oxidative and non-oxidative methods have been employed to introduce aldehyde groups onto polysaccharides. Oxidative methods which have been used include treating with periodic acid, periodates, alkali metal ferrates, or alkali aetal bromites, as described, for example, in U.S. Pat. No. 3,086,969 (issued Apr. 23, 1963 to J. Slager); U.S. Pat. No. 3,553,193 (issued Jan. 5, 1971 to D. LeRoy et al.); and U.S. Pat. No. 3,632,802 (issued Jan. 4, 1972 to J. BeMiller et al.). Non-oxidative methods which have been used include the reaction of a polysaccharide with an aldehyde-containing reagent as described in U.S. Pat. No. 3,519,618 (issued July 7, 1970 to S. Parmerter) and U.S. Pat. No. 3,740,391 (issued June 19, 1973 to L. Williams et al.).

Polygalactomannan gums (i.e. guar gum) and other natural galactose-containing polymers modified to possess aldehyde groups are useful as crosslinking agents and have been employed in various film-forming applications as adhesives or binding agents in self-sustaining films. Such aldehyde gum derivatives can be prepared by similar oxidative and non-oxidative methods to those mentioned above or, as described in U.S. Pat. No. 3,297,604 (issued Jan. 10, 1967 to F. Germino), polygalactomannans and other natural polysaccharides containing galactose configurations at the $C_4$ position (i.e., talose) may be selectively oxidized at the $C_6$ position of the saccharide unit by the enzyme galactose oxidase in order to yield aldehyde groups.

While commercially useful polysaccharide aldehydes have been obtained by various oxidative and non-oxidative methods, there is a continual demand to meet a broad industrial need for new polysaccharide compositions with unique rheological properties which also possess the aldehyde functionality.

It is therefore the object of the present invention to provide novel aldehyde-containing heteropolysaccharides, the polysaccharides being capable of undergoing crosslinking reactions alone or with other organic compounds. None of the above references disclose or suggest the products of the present invention.

SUMMARY

The present invention provides novel ethyl glycoside starch ether derivatives which have the structure

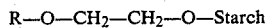

where Starch—O represents a starch molecule and R represents a monosaccharide with the oxygens linking the monosaccharide and the starch being attached to the glycosidic carbon atom of the monosaccharide by an acetal or ketal linkage and being attached to the starch by an ether linkage. Typical monosaccharides includes hexoses such as glucose, mannose, galactose, talose, gulose, allose, altrose, idose, fructose and sorbose and pentoses such as gylose, arabinose, ribose, and lyxose. The corn and wheat starch ether derivatives in aqueous solution after gelatinization exhibit stable cook properties. Such cook stability permits the derivatives herein to be utilized for example, in various food and thickening applications.

When R represents a hexose having a galatose configuration at the $C_4$ position, the starch derivatives are useful in the preparation of novel aldehyde-containing starches. By treating these starch ether derivatives with the enzyme galactose oxidase, the $C_6$ position of the glycoside unit is selectively oxidized to the aldehyde functionality. The resulting aldehyde containing derivative has the structure

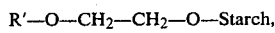

where R' is

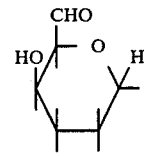

Starch ether derivatives represented by the structure

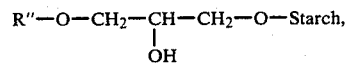

where R" is

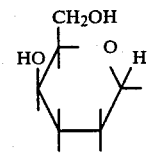

are also useful in the preparation of novel aldehyde-containing starches by the galactose oxidase reaction. The resulting aldehyde-containing starch ether has the structure

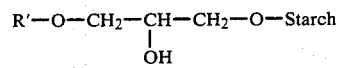

where R' is as defined above.

The aldehyde-containing starches herein are useful as paper strengthening additives.

DETAILED DESCRIPTION OF THE PREFERRED EMBODIMENTS

Glycosides may be prepared from mono- and polysaccharides which contain a reducing carbon atom. This carbon atom, which is located in the terminal saccharide ring, is capable of reacting with an alcohol to form glycosidic products attached by an acetal or ketal linkage, depending on the mono- or polysaccharide employed.

A. Halohydrin and Glycidyl Glycoside Reagents

One class of glycosides applicable for use as reagents in preparing the glycoside starch ethers useful herein include glycosides having the formula:

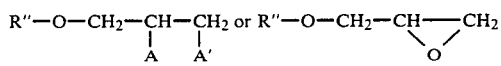

wherein R″ is as shown above and represents a monosaccharide containing a galactose configuration at the $C_4$ position and where the O is attached to the glycosidic carbon atom of the monosaccharide (i.e., the $C_1$ position), and A and A′ are alternately a hydroxyl or a halogen selected from the group consisting of chlorine or bromine.

The halohydrin or glycidyl glycosides may be prepared according to the methods described in U.S. Pat. No. 3,931,148 issued Jan. 6, 1976 to W. Langdon which teaches that glycosides may be prepared by reacting monosaccharides at temperatures of about 94° to 108° C. with 3-chloro-1,2-propandiol in the presence of about 0.01 to 2.0 weight percent, based on the reactants, of a strong acid catalyst.

The halohydrin or glycidyl glycosides are preferably prepared by reacting the monosaccharide in an excess of 3-halo-1,2-propandiol in the presence of a cationic exchange resin. By employing a cationic exchange resin, the glycosides may be prepared at moderate temperatures without charring which is often caused by strong low molecular weight acids at the higher temperatures mentioned above. The reaction is conducted with stirring at a temperature of about 55°–80° C. over a period of about 3–20 hours. After the reaction is complete, the mixture is filtered in order to remove the cationic exchange resin. The excess diol may then be removed by vacuum distillation or washing with organic solvents in order to obtain the 3-halo-2-hydroxypropyl glycoside.

The halogenated propandiols which may be employed include 3-chloro-1,2-propandiol and 3-bromo-1,2-propandiol. The use of the chloro derivative is preferred due to its commercial availability and cost. While a saccharide to diol ratio of as little as 1:1.4 has been employed, a preferred ratio is at least 1:3 to 1:6, most preferably 1:5.

Any cationic exchange resin may be used in the glycoside preparation. Suitable exchange resins include sulfonated-crosslinked polystyrene such as commercially available Amberlite IR-120 from Rohm and Haas, Dowex 50 from Dow Chemical and Permutit Q from Permutit; sulfonated phenolics such as Duolite C-3 from Diamond Shamrock, and sulfonated coals such as Zeo Karb H from Permutit. The preferred cationic exchange resin is Dowex 50. The amount of resin useful herein is about 1 part resin to 2–8 parts by weight of saccharide, preferably 1 part resin to 4–5 parts saccharide.

The glycidyl glycosides useful herein may be prepared by reacting a 3-halo-2-hydroxypropyl glycoside with an alkali metal hydroxide in order to form the epoxide group. Typically, the glycoside is mixed with an aqueous alkaline solution while cooling. The mixture is neutralized with acid and then dissolved in alcohol in order to precipitate the metal salts formed. After filtration, the glycidyl glycoside may be recovered by removing the alcohol and water by vacuum distillation.

B. Haloethyl Glycoside Reagents

Another class of glycosides which are useful reagents in preparing the glycoside starch ethers herein have the formula:

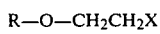

wherein R—O represents a monosaccharide where O is attached to the glycosidic carbon atom of the monosaccharide and X is chlorine or bromine. Any monosaccharide containing a reducing carbon atom may be reacted with a haloethanol in the presence of a strong acid catalyst or a cationic exchange resin, by similar methods described above in order to obtain the haloethyl glycoside. Typical monosaccharides include, for example, glucose, fructose, sorbose, mannose, galactose, talose, xylose, and ribose.

The haloethyl glycosides specifically useful for preparing the starch ethers which are oxidized by enzyme treatment have the formula:

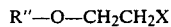

where R—O and X are as defined above.

In some instances, the haloethyl glycosides are preferably employed in the preparation of the starch ethers useful herein because impurities (i.e., 1,3-dichloro-2-propanol) present in the 3-halo-1,2-propandiol, used to prepare the halohydrin glycosides, are very difficult to remove from the glycosides and as such will react with starch as a crosslinker.

The halohydrin, glycidyl and haloethyl glycosides herein are capable of reacting under etherification conditions with polysaccharides including, for example, starches and starch conversion products derived from any plant source; starch ethers and esters; cellulose and cellulose derivatives and various plant gums and gum derivatives.

C. Hydroxypropyl and Ethyl Glycoside Starch Ether Derivative Preparation

The applicable starch bases which may be used in preparing the glycoside starch ether derivatives herein may be derived from any plant source including corn, potato, sweet potato, wheat, rice, sago, tapioca, waxy maize, sorghum, high amylose corn, or the like. Also included are the conversion products derived from any of the latter bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized starches such as ethers and esters. The starch base may be a granular starch or a gelatinized starch, i.e., non-granular starch.

Methods for preparing the modified starch bases useful herein are well-known to those skilled in the art and discussed in the literature. See, for example, R. L. Whistler, Methods in Carbohydrate Chemistry, Vol. IV, 1964, pp. 279–311; R. L. Whistler et al., Starch-Chemistry and Technology, Vol. II, 1967, pp. 293–450; and R. Davidson and N. Sittig, Water Soluble Resins, 2nd Ed., 1968, Chapter 2.

The starch etherification reactions herein may be represented by the following equations:

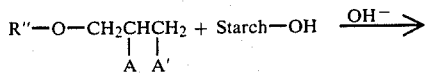

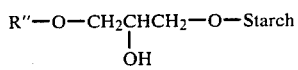

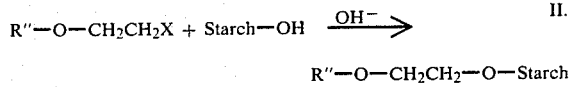

wherein Starch—OH represents a starch molecule and R″, A, A′, and X are as defined above.

It should be noted that use of a glycidyl glycoside herein will result in the same starch reaction product (see Equation I) as will use of the halohydrin glycoside. The etherification reaction proceeds only under alkaline conditions after the halohydrin group is first converted to the epoxide form.

Equation II represents the specific reaction of the preparation of the starch ethers useful in the preparation of the novel starch aldehydes herein. It is, however, only one embodiment of the reaction which produces novel starch derivatives from haloethyl glycosides and starch which may be represented by the equation: R—O—CH$_2$CH$_2$X+Starch—OH→R″—O—CH$_2$C-H$_2$—O—Starch wherein Starch—OH, R, and X are as previously defined. While not wishing to be bound by theory, it is believed that the haloethyl group reacts with the starch molecule through a neighboring group participation mechanism.

The practitioner will recognize that the starch molecule is a polysaccharide composed of many anhydroglucose units, each having three free hydroxyl groups (except the non-reducing end glucose units which contain four free hydroxyl groups) which may react with the glycoside reagent. Thus, the number of such displacements or the degree of substitution (D.S.) will vary with the particular starch, the ratio of reagent to starch, and to some extent. the reaction conditions. Furthermore, since it is known that the relative reactivity of each of the hydroxyl groups within the anhydroglucose unit is not equivalent, it is probable that some will be more reactive with the reagent than others.

The monosaccharide portion of the glycoside reagents also contain free hydroxyl groups. It should therefore be understood that during the etherification reaction, there is a possibility that a glycoside reagent may react with another reagent molecule. Such a reaction would yield a saccharide-containing molecule which would still contain an unreacted glycidyl or haloethyl group capable of reacting with starch and a saccharide unit which contains the galactose configuration at the C$_4$ position. No crosslinking will result from this reaction since there is only one reactive site per molecule.

The starch reaction may be conducted by a number of techniques known in the art employing, for example, an aqueous reaction medium, an organic solvent medium, or a dry heat reaction technique wherein a wet starch cake is impregnated with the glycoside reagent then subjected to dry heat.

In the preferred method, the reaction is carried out in an aqueous medium using either an aqueous slurry or an aqueous dispersion of the starch base. The glycoside reagent may be added to the reaction mixture as a solid or an aqueous solution. The preferred concentration of the solution is 20-50% by weight, based on the weight of reagent. In an alternative method, the glycoside reagent solution is brought to the desired alkaline pH prior to its addition to the starch base, this being accomplished by the addition of sufficient alkali. In another variation, dry starch may be added to an alkaline solution of the glycoside reagent.

The amount of glycoside reagent to be employed in the reaction with the starch herein will generally vary from about 0.1 to 100% by weight, based on the weight of dry starch, depending on such factors as the starch based used, the glycoside reagent used, the degree of substitution desired in the end product, and, to some extent, the reaction conditions used.

The starch reaction is carried out under alkaline conditions, at a pH of 11-13, preferably 11.4-12.4. Alkali may be added to the starch slurry or dispersion either prior to or after the addition of the glycoside reagent. The pH is conveniently controlled by the addition of sodium hydroxide, potassium hydroxide, calcium hydroxide, tetramethylammonium hydroxide, and the like. The preferred base is sodium hydroxide.

When conducting the reaction with granular starches, it may sometimes be desirable to carry out the reaction in the presence of salts, e.g. sodium sulfate, in amounts of from about 10 to 40% by weight, based on dry starch. The presence of sodium sulfate acts to suppress swelling of the starch and gives a more filterable product. The sodium sulfate is not used in the calcium hydroxide reactions.

The reaction mixture is agitated under the desired reaction conditions. The reaction time may vary from 0.5 to 20 hours, depending on such factors as the amount of the glycoside reagent employed, the temperature, the pH, the scale of the reaction, and the degree of substitution desired. In general, the preferred range of reaction times is from 6 to 16 hours.

The reaction is carried out at a temperature of from 20°-95° C., preferably 25°-45° C. It will be recognized by the practitioner that the use of temperatures above about 60° C. with granular starches in an aqueous medium will result in granule swelling and filtration difficulties or in gelatinization of the starch. In instances where higher reaction temperatures are desired, an aqueous solution containing a water-miscible solvent may be employed to prevent swelling.

After completion of the reaction, the pH of the reaction mixture is adjusted to a value of from 3 to 7 with any commercial acid such as hydrochloric acid, sulfuric acid, acetic acid, and the like. Such acids may be conveniently added as a dilute aqueous solution.

Recovery of the derivatives may be readily accomplished, with the particular method employed being dependent on the form of the starch base. Thus, a granular starch is recovered by filtration, optionally washed with water to remove any residual salts, and dried. The granular starch products may also be drum-dried, spray-dried, or gelatinized and isolated by alcohol precipitation or freeze drying to form non-granular products (i.e. gelatinized). If the starch product is non-granular, it may be purified by dialysis to remove residual salts and isolated by alcohol precipitation, freeze drying, or spray drying.

D. Novel Aldehyde-Containing Starch Derivative Preparation

The novel aldehyde-containing starch derivatives herein can be prepared according to the invention by enzymatic oxidation of those glycoside starch ethers described above and shown in Equations I and II, wherein the glycoside substituent (R'') is the monosaccharide containing a galactose configuration at the $C_4$ position. Such monosaccharides, are exemplified by galactose and talose:

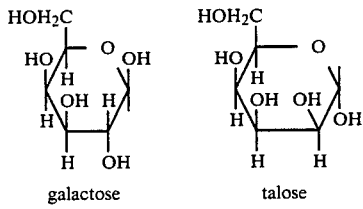

galactose   talose

Oxidation at the $C_6$ position of the glycoside substituent is effected by incubating the starch ether derivative which has been dispersed in an aqueous buffer solution in an amount determined by the solubility of the components, with the galactose oxidase. The reaction is conducted in the presence of oxygen at a pH range from 4 to 9, preferably 5 to 8, and at a temperature of about 10° to 60° C. with ambient temperatures preferred. The oxidation is preferably conducted in the presence of the enzyme catalase which facilitates the reduction of hydrogen peroxide (a byproduct of the oxidation) to water and oxygen.

After the incubation, the enzyme is inactivated (i.e., by removal of the oxygen source, heating, or lowering the pH). The starch aldehydes may then be isolated by known procedures or remain in solution.

Starch reacted with 2-haloethyl galactoglycoside and then oxidized with galactose oxidase, for example, would yield a starch derivative having randomly occurring aldehyde-containing galactose side chains as depicted below:

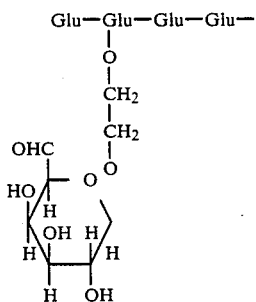

where Glu—Glu—Glu—Glu— represents the starch chain.

The aldehyde functionality present on the starch derivatives herein renders the products useful, for example, as paper strengthening additives. This aldehyde functionality also makes them useful as co-reactants in the Maillard reaction, the well-known browning and flavorproducing reaction occurring in foods (see U.S. Pat. No. 3,716,380 issued Feb. 13, 1973 to P. J. van Pottelsberghe de la Potterle for a description of this reaction, as well as U.S. Pat. Nos. 3,615,600 and 3,761,287 issued Oct. 26, 1971 and Sept. 25, 1973 to C. H. T. T. Zevennar and K. Jaeggi, respectively, and Brit. Pat. No. 1,285,568 published Aug. 16, 1972 by J. L. Godman et al.). The process for preparing artificial flavors using the Maillard reaction typically involves reacting together, in the presence of water, a saccharide, one or more amino acids, and optionally other ingredients such as hydrogen sulfide (see Brit. Pat. No. 1,285,568), succinic acid and a hYdroxycarboxylic acid (see U.S. Pat. No. 3,615,600), a polyalcohol (see U.S. Pat. No. 3,761,287), or a lower carboxylic acid or fatty acid (see U.S. Pat. No. 3,716,380).

Suitable amino acids include glycine, alanine, proline, hydroxyproline, threonine, arginine, glutamic acid, aspartic acid, histidine, lysine, leucine, isoleucine, serine, valine, and taurine. Smaller amounts of tyrosine, tryptophan, cystein, phenylalanine, and methionine are not objectionable, depending upon the flavor desired. Di-, tri-, or higher peptides, or proteins giving rise to the requisite amino acids can also be used. Protein hydrolysates are convenient sources.

The saccharides conventionally used include monosaccharides or di-, tri-, or polysaccharides which yield monosaccharides under the Maillard reaction conditions. The above aldehyde-containing heteropolysaccharides are used as a partial or total replacement for these saccharides.

Factors which affect the nature and quality of the flavor produced include the nature and relative amounts of saccharide, amino acid, and other optional components, as well as the amount of water and temperature and time of the reaction.

The following examples will more fully illustrate the practice of this invention but they are not intended to limit its scope. All parts and percentages are given by weight and all temperatures are in degrees Celsius unless otherwise noted. The carbonyl content of the starch aldehydes was determined using the procedure described in "Quantitative Organic Analysis via Functional Groups", 3rd Edition by Sidney Siggia (John Wiley & Sons, Inc., New York, 1949), p. 73.

EXAMPLE 1

This example illustrates the preparation of the halohydrin and haloethyl glycoside starting materials employed herein:

a. 3-Chloro-2-hydroxypropyl galactoglycoside

To a 0.5 liter round-bottom flask equipped with condenser, mechanical stirrer and means for heating, there was added 80 g (0.44 mole) of galactose, 237 g (2.15 moles) of 3-chloro-1,2-propandiol, and 20 g Dowex 50W-X8 cationic exchange resin (1.9 meq/ml) in H+form. The mixture was heated to 60°-63° C. and stirred at that temperature for 16 hours. The reaction mixture was cooled and then filtered over a gauze cloth to remove the resin. The reaction mixture was clear and light yellow in color. Unreacted diol was removed by vacuum distillation at 80° C. at 2 mm Hg. The hygroscopic solid product was slurried in acetone and filtered three times to remove residual impurities then dried in a vacuum dessicator.

b. 2-Chloroethyl galactoglycoside

To an apparatus similar to that described in Part a, was added 80 g of galactose, 217 g (2.69 moles) 2-chloroethanol, and 20 g Dowex 50W-X8. The mixture was heated to and stirred at 55° C. for 16 hours and at 80° C. for an additional 4 hours. The cationic exchange resin was removed as above. The unreacted 2-chloroethanol was then removed by vacuum distillation at 30°–35° C. at 0.1 mm Hg. then dried in a vacuum dessicator.

EXAMPLE 2

This example illustrates the preparation of an ethyl galactoglycoside starch ether.

A total of 100 parts of corn starch and 10 parts 2-chloroethyl galactoglycoside (as is) were added to a solution of 3.0 parts sodium hydroxide and 30 parts sodium sulfate in 150 parts water. The mixture was agitated for 16 hours at 40°–45° C. The pH was then lowered to 5.5 by the addition of 9.3% aqueous hydrochloric acid. The starch derivative (A) was recovered by filtration, washed three times with distilled water and air dried.

Aqueous slurries containing 96 parts water and 8 parts of the derivatized starch product or its underivatized base were cooked for comparison in a boiling water bath for 20 minutes. The gelatinized cooks stood overnight at room temperature before examination. The corn base cook produced a firm gel. The derivatized starch cook, on the other hand, did not form a gel but was stabilized.

EXAMPLE 3

This example illustrates the preparation of an ethyl galactoglycoside ether of a cationic fluidity starch.

Corn starch which had been acid hydrolyzed to a final water fluidity (WF) of 75 was first reacted with 2.7% diethylaminoethyl chloride hydrochloride as described in U.S. 2,876,217 (issued on Mar: 3, 1959 to E. Paschall). Thereafter the cationic fluidity starch was reacted with 30% 2-chloroethyl galactoglycoside as in Example 2. The starch derivative (B) was also recovered by filtration, washed three times with distilled water and air dried.

EXAMPLE 4

Hydroxypropyl galactoglycoside ethers of various starch bases were prepared according to the procedure described in Example 2. The reaction data may be found in Table I.

TABLE I

| Hydroxypropyl Galactoglycoside Starch Ether | Reactants Starch Base | Starch WF | % 3-chloro-2-hydroxy-propyl galactoglycoside |
|---|---|---|---|
| C | waxy maize | —* | 10 |
| D | waxy maize | 85 | 20 |
| E | corn | 74 | 20 |
| F | tapioca | 80 | 20 |

*Starch base was not hydrolyzed.

Comparative Sample G was prepared by reacting 85 WF waxy maize with 20% 3-chloro-1,2-propandiol.

EXAMPLE 5

This example illustrates the preparation of an aldehyde-containing starch derivative by enzyaatic oxidation of the ethyl galactoglycoside starch ether of Example 3.

A total of 6.0 g. of derivative B was slurried in 90 ml of pH 7 phosphate buffer solution (0.68 parts potassium phosphate, monobasic and 0.16 parts sodium hydroxide in 100 parts distilled water) which contained 0.15 g Dowicide A (a preservative obtained from Dow Chemical Corp.). The slurry was cooked for 20 minutes in a boiling water bath (BWB) to gelatinize the starch then cooled to 35° C. at which time the Brookfield viscosity of the 30% solids sample was measured as 450 cps. (20 rpm, spindle #5). A total of 1.7 mg (225 units) of galactose oxidase and 30 mg (60,000 units) catalase were dissolved in 5 ml of additional buffer solution then added directly to the starch dispersion. While under continuous oxygen purge the mixture was agitated at 37° C. for four days after which time the reaction was stopped by the elimination of the oxygen purge. The 6.4% solids starch dispersion after oxidation had increased in Brookfield viscosity to over 200,000 cps (20 rpm, spindle #7). The material had a carbonyl content of 0.54%.

EXAMPLE 6

Hydroxypropyl galactoglycoside starch ether derivative, C, was similarly oxidized with galactose oxidase to yield a starch aldehyde derivative.

A total of 14.0 g of C and 0.25 g Dowicide A was slurried in 286 ml of the phosphate buffer solution and cooked as in Example 5. The 4.5% solids dispersion had an initial Brookfield viscosity of 3,800 cps (20 rpm, spindle #5). A total of 0.57 mg (75 units) galactose oxidase and 10 mg (20,000 units) catalase were dissolved in 21 ml buffer solution. The enzyae solution was added to the starch dispersion and then reaction was conducted for 24 hours under the conditions described in Example 5. The 4.9% solids starch dispersion after oxidation had increased in Brookfield viscosity to about 5,900 cps. (20 rpm, spindle #5). The material had a carbonyl content of 0.32%.

In aqueous dispersion, this particular starch aldehyde product was observed to be uniquely thixotropic, i.e., while stirring it appeared thin, however, when stirring ceased, the product would reform a gel structure.

EXAMPLE 7

Starch galactoglycosides D, E, and F and comparative starch sample G were also oxidized with galatose oxidase as described in Example 5. The reaction conditions and results may be found in Table II.

TABLE II

| Starch galactoglycoside | D | E | F | G* |
|---|---|---|---|---|
| % Dispersion Solids | 30 | 15 | 15 | 30 |
| Initial Brookfield Viscosity (cps)** | 380 | 175 | 225 | 200 |
| Enzyme Treatment: | | | | |
| Galactose oxidase units/g starch | 15 | 30 | 30 | 15 |
| Catalase units/g starch | 4,000 | 8,000 | 8,000 | 4,000 |
| Reaction Conditions: | | | | |
| Temperature (°C.) | 37° | 37° | 37° | 37° |
| Time | 16 hr. | 4 days | 4 days | 4 days |
| Results: | | | | |
| % Dispersion Solids | 25.5 | 11.2 | 11.5 | 11.5 |
| Final Brookfield Viscosity (cps)** | >200,000 | 250 | 225 | 200 |
| % Carbonyl Content | 0.67 | 0.25 | 0.30 | 0.00 |

*Comparative.
**Measured at 20 rpm, Spindle #5.

In a like manner, starch may be reacted with 2-chloroethyl taloglycoside or 3-chloro-2-hydroxypropyl taloglycoside, as described in Example 2, to yield an ethyl or hydroxypropyl taloglycoside starch ether. These starch ether derivatives may be similarly treated with galactose oxidase as described above to also provide starch aldehyde derivatives.

EXAMPLE 8

This example illustrates the use of an ethyl galactoglycoside starch ether in a pourable sauce formulation.

Corn starch was treated with 20% of 2-chloroethyl galactoglycoside as described in Example 2. The ethyl galactoglycoside starch ether (H) was added to a barbecue sauce formulation and compared with a similar sauce which employed the underivatized corn starch base. The following recipe was employed:

| Ingredients | Parts |
|---|---|
| Starch derivative | 2.5 |
| Sugar | 3.0 |
| Salt | 0.3 |
| Paprika | 0.2 |
| Chili Powder | 0.2 |
| Cinnamon | 0.2 |
| Ground Cloves | 0.2 |
| Tomato Puree | 47.4 |
| Minced Onion | 5.3 |
| Worcestershire Sauce | 6.6 |
| Water | 26.2 |
| Vinegar | 7.9 |

The sauces were heated to 85° C. (185° F.), held for 15 minutes, and cooled overnight at room temperature prior to observation. The sauce containing starch glycoside (H) was smooth and pourable. This was in contrast to the sauce prepared with the underivatized corn starch which resulted in a lumpy, very heavy product.

EXAMPLE 9

This example describes the use of the starch aldehydes herein as paper strength additives.

Corn starch which had been acid hydrolyzed to a final WF of 70 was first reacted with 3.0% diethylaminoethyl chloride hydrochloride as in Example 3. Thereafter the control cationic fluidity starch (J) was reacted with 20% 2-chloroethyl galactoglycoside as in Example 2. A 10 g sample of the ethyl galactoglycoside was oxidized with 250 units of starch ether galactose oxidase in the presence of 60,000 units of catalase resulting in a starch aldehyde (K) having an aldehyde content of 0.40%

Unbleached softwood Kraft was refined to a 550 Canadian Standard Freeness. A total of 3.3% alum was added to the furnish and the pH was adjusted to 5.5. The starch derivatives were added to the furnish and four gram handsheets were prepared on the Noble and Wood Sheet Mold, pressed, and dried at 149° C. (300° F.). The Z-directional strength of the sheets was measured using a Scott Bond apparatus. The dry strength of the sheets was recorded in foot-pounds in thousands. The addition level of the starch was 30 lb./ton. Test results are given in Table III.

TABLE III

| Starch Derivative | Dry Strength |
|---|---|
| Blank | 234 |
| Control (J) | 293 |
| Starch Aldehyde (K) | 323 |

The results show that the starch aldehyde gave improved dry strength in comparison to the starch base control from which it was prepared.

EXAMPLE 10

This example describes the preparation of an artificial flavor using the starch aldehyde herein as a replacement for the saccharide used in the Maillard reaction.

A mixture of histidine (0.75 g.), tyrosine (0.63 g.), glutamic acid (14.21 g), glycine (0.14 g.), alanine (1.10 g.), and leucine (1.03 g.), in water is adjusted to pH 6 (NaOH). The starch aldehyde of Example 5 (3.6 g), glucose (4.5 g.), and sodium sulfide nonahydrate (2.68 g.) are added, the volume is made up to 76 ml. with water and the mixture is heated with stirring under reflux in a 130° C. bath for about 6 hours. After cooling, corn flour (55.2 g.) may be added and the product freeze-dried to yield a powdered flavor.

In summary, the present invention is seen to provide novel ethyl glycoside starch ether derivatives. Moreover, novel starch aldehydes are provided which are useful in conventional applications where starch aldehydes prepared by other chemical oxidative and nonoxidative means have been found useful, i.e., in paper and textile sizing. The starch aldehydes are also useful as crosslinking agents. In many cases, when self-crosslinked, the starches exhibit significant viscosity increases which make them useful as thickeners in various applications including food systems.

As various changes could be made in the above methods and products without departing from the scope of the invention, it is intended that all matter contained in the above description shall be interpreted as illustrative and not in a limiting sense.

I claim:

1. A starch ether having the structure R—O—CH$_2$—CH$_2$—O—Starch wherein Starch—O represents a starch molecule and R represents a monosaccharide with the oxygens linking the monosaccharide and the starch being attached to the glycosidic carbon atom of the monosaccharide by an acetal or ketal linkage and being attached to the starch molecule by an ether linkage.

2. The starch ether of claim 1, wherein the monosaccharide is selected from the group consisting of glucose, fructose, sorbose, mannose, galactose, talose, xylose, and ribose.

3. The starch ether of claim 2, wherein the monosaccharide is galactose.

4. A process for preparing the starch ether of claim 1, comprising the steps of:
 (a) reacting a starch base with about 0.1 to 100% by weight, based on the starch, of a glycoside reagent having the structure R—O—CH$_2$—CH$_2$—X wherein X is chlorine or bromine; and
 (b) isolating the resulting starch ether.

5. The process of claim 4, wherein the reaction is carried out in an aqueous medium at a pH of 11-13 for 0.5 to 20 hours at a temperature of 20°-95° C.

6. The process of claim 5, wherein the reaction is carried out at an pH of 11.4-12.4 for 6 to 16 hours at a temperature of 25°-45° C.

7. An aldehyde-containing starch ether having the structure R'—O—A—O—Starch, where A is —CH$_2$—CH$_2$— or

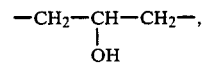

Starch-O represents a starch molecule, and R' is

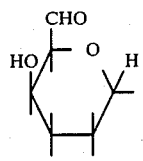

which represents a hexose containing a galactose configuration at the $C_4$ position with the oxygens being attached to the glycosidic carbon atom of the hexose by an acetal linkage and to the starch by an ether linkage.

8. The starch aldehyde of claim 7, wherein the starch is selected from the group consisting of corn, waxy maize, and tapioca, the conversion products thereof and the derivatized products thereof and wherein the derivatization employs an etherifying or esterifying reagent.

9. The starch aldehyde of claim 7, wherein A is —$CH_2$—$CH_2$— and the hexose is galactose.

10. The starch aldehyde of claim 7, wherein A is

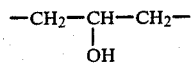

and the hexose is galactose.

11. The starch aldehyde of claim 10, wherein Starch-O is waxy maize; the aqueous dispersion of said starch aldehyde being characterized by being thixotropic.

12. The starch aldehyde of claim 7, wherein the starch aldehyde has a carbonyl content of at least 0.25%.

13. An aldehyde-containing starch ether, prepared by reacting a mixture of:
   (a) an aqueous dispersion of a starch ether selected from the group consisting of R"—O—$CH_2$—$CH_2$—O—Starch or

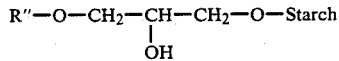

wherein Starch-O-represents a starch molecule and R" is

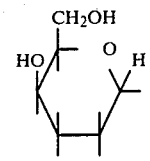

represents a hexose containing a galactose configuration at the $C_4$ position with the oxygens linking the monosaccharide and the starch being attached to the glycosidic carbon atom of the hexose by an acetal linkage and to the starch by an ether linkage; and (b) a galactose oxidase enzyme in the presence of oxygen, whereby the $C_6$ position of monosaccharide is oxidized to form a carbonyl group.

14. The starch aldehyde of claim 13, wherein the reaction is conducted in the presence of the enzyme catalase.

15. The starch aldehyde of claim 14, wherein the reaction is conducted at a pH of about 4 to 9 and at a temperature of about 10° to 60° C.

16. The starch aldehyde of claim 13, wherein the starch is selected from the group consisting of corn, waxy maize, and tapioca, the conversion products thereof and the derivatized products thereof and wherein the derivatization employs an etherifying or esterifying reagent.

17. The starch aldehyde of claim 13, wherein the R" is galactose.

18. In a process for preparing an artificial flavor by heating together, in an aqueous medium, a mixture comprising at least one amino acid and a saccharide, wherein the improvement comprises the replacement of at least part of the saccharide with the starch aldehyde of claim 7.

19. The artificial flavor prepared by the process of claim 18.

* * * * *

UNITED STATES PATENT AND TRADEMARK OFFICE
CERTIFICATE OF CORRECTION

PATENT NO. : 4,663,448
DATED : May 5, 1987
INVENTOR(S) : Chiu, Chung-Wai

It is certified that error appears in the above-identified patent and that said Letters Patent are hereby corrected as shown below:

At column 2, line 3, "gylose" should be --xylose--.

At column 7, lines 12-21, the correct structures are:

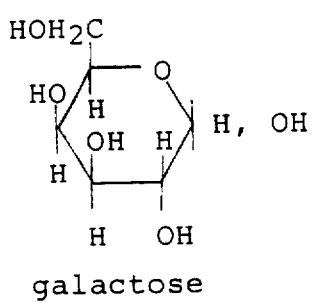

galactose

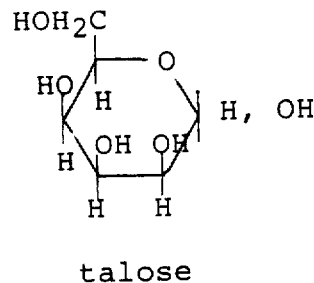

talose

UNITED STATES PATENT AND TRADEMARK OFFICE
CERTIFICATE OF CORRECTION

PATENT NO. : 4,663,448
DATED : May 5, 1987
INVENTOR(S) : Chiu, Chung-Wai

It is certified that error appears in the above-identified patent and that said Letters Patent is hereby corrected as shown below:

At column 7, lines 42-55, the correct structure is:

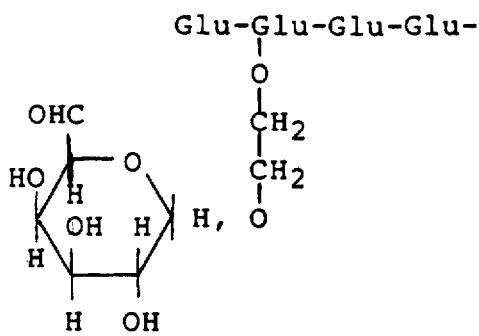

Signed and Sealed this

Seventh Day of June, 1988

Attest:

DONALD J. QUIGG

Attesting Officer       Commissioner of Patents and Trademarks